United States Patent
Haddad et al.

(10) Patent No.: US 8,295,487 B2
(45) Date of Patent: Oct. 23, 2012

(54) METHOD AND APPARATUS FOR ESTABLISHING A CRYPTOGRAPHIC RELATIONSHIP IN A MOBILE COMMUNICATIONS NETWORK

(75) Inventors: Wassim Haddad, San Jose, CA (US); Mats Naslund, Bromma (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 208 days.

(21) Appl. No.: 12/744,198

(22) PCT Filed: Nov. 21, 2008

(86) PCT No.: PCT/EP2008/065967
§ 371 (c)(1),
(2), (4) Date: May 21, 2010

(87) PCT Pub. No.: WO2009/065923
PCT Pub. Date: May 28, 2009

(65) Prior Publication Data
US 2010/0260338 A1    Oct. 14, 2010

(30) Foreign Application Priority Data
Nov. 22, 2007 (GB) .................................. 0722899.2

(51) Int. Cl.
*G06F 21/22* (2006.01)
(52) U.S. Cl. ........... 380/270; 726/22; 380/283; 713/171
(58) Field of Classification Search ........................ None
See application file for complete search history.

(56) References Cited

U.S. PATENT DOCUMENTS

2007/0113075 A1* 5/2007 Jo et al. ..................... 713/158
2008/0059792 A1* 3/2008 Feder et al. ................ 713/155
2009/0138955 A1* 5/2009 Vinayakray-Jani .......... 726/12

OTHER PUBLICATIONS

Lee, J., "Flusing Mechanism for Routing Optimizaiton in PMIPv6," IETF standard-working-Draft, Internet.*
Office Action issued in corresponding EP Application No. 08 852 308.9 on Nov. 17, 2010, 4 pages.
Aura, T., "Cryptographically Generated Addresses (CGA)," IETF Standard, Internet Engineering Task Force, Mar. 1, 2005, pp. 1-22; The Internet Society.
Calderon, M., "Securing Route Optimisation in NEMO," Modeling and Optimization in Mobile, Ad Hoc and Wireless Networks 2005 WIOPT 2005. Third International Symposium on Riva Del Garda, Trentino Italy, Apr. 4, 2005, pp. 248-254, IEEE, Piscataway, NJ.
Lee, J., "Flushing Mechanism for Routing Optimization in PMIPv6," IETF Standard-Working-Draft, Internet Engineering Task Force, Jun. 27, 2007, pp. 1-8.
Sarikaya, B., "PMIPv6 Route Optimization Protocol," IERF Standard-Working-Draft, Internet Engineering Task Force, Nov. 14, 2007, No. 1., pp. 1-23.

* cited by examiner

*Primary Examiner* — Fikremariam A Yalew
(74) *Attorney, Agent, or Firm* — Rothwell, Figg, Ernst & Manbeck, P.C.

(57) ABSTRACT

A method and apparatus for establishing a cryptographic relationship between a first node and a second node in a communications network. The first node receives at least part of a cryptographic attribute of the second node, uses the received at least part of the cryptographic attribute to generate an identifier for the first node. The cryptographic attribute may a public key belonging to the second node, and the identifier may be a Cryptographically Generated IP address. The cryptographic relationship allows the second node to establish with a third node that it is entitled to act on behalf of the first node.

12 Claims, 5 Drawing Sheets

METHOD AND APPARATUS FOR ESTABLISHING A CRYPTOGRAPHIC RELATIONSHIP IN A MOBILE COMMUNICATIONS NETWORK

CROSS-REFERENCE TO RELATED APPLICATIONS

This application is a 35 U.S.C. §371 National Phase Application from PCT/EP2008/065967, filed Nov. 21, 2008, and designating the United States, and claims priority to GB Application No. 0722899.2, filed Nov. 22, 2007. The above-mentioned applications are incorporated by reference herein.

TECHNICAL FIELD

The present invention relates to the field of communications networks, and in particular to establishing a cryptographic relationship between two nodes in the communications network.

BACKGROUND

Mobile IPv6 (MIPv6), described in D. Johnson, C. Perkins and J. Arkko, "Mobility Support in IPv6", RFC 3775, June 2004, allows users of mobile communications devices to move from one network to another whilst maintaining a permanent IP address, regardless of which network they are in. This allows a user to maintain connections whilst on the move. For example, if a user were participating in a Voice Over IP (VoIP) session and, during the session the user moved from one network to another, without MIPv6 support the user's IP address may change. This would lead to problems with the VoIP session.

A Mobile Node (MN) is allocated two IP addresses: a permanent home address and a care-of address (CoA). The CoA is associated with an access network, an IP subnet, which the user is currently visiting. To communicate with the MN, packets are sent to the MN home address. These packets are intercepted by a Home Agent (HA) in the MN's home network. The HA has knowledge of the current CoA. The Home Agent then tunnels the packets to the CoA of the MN with a new IP header, whilst preserving the original IP header. When the packets are received by the MN, it removes the new IP header and obtains the original IP header. The MN sends packets to another node by tunnelling them to the HA, encapsulated in packets addressed to the HA. For each packet, the HA removes the encapsulating packet, restores the original packet and forwards it to the intended destination node.

Figure 1:
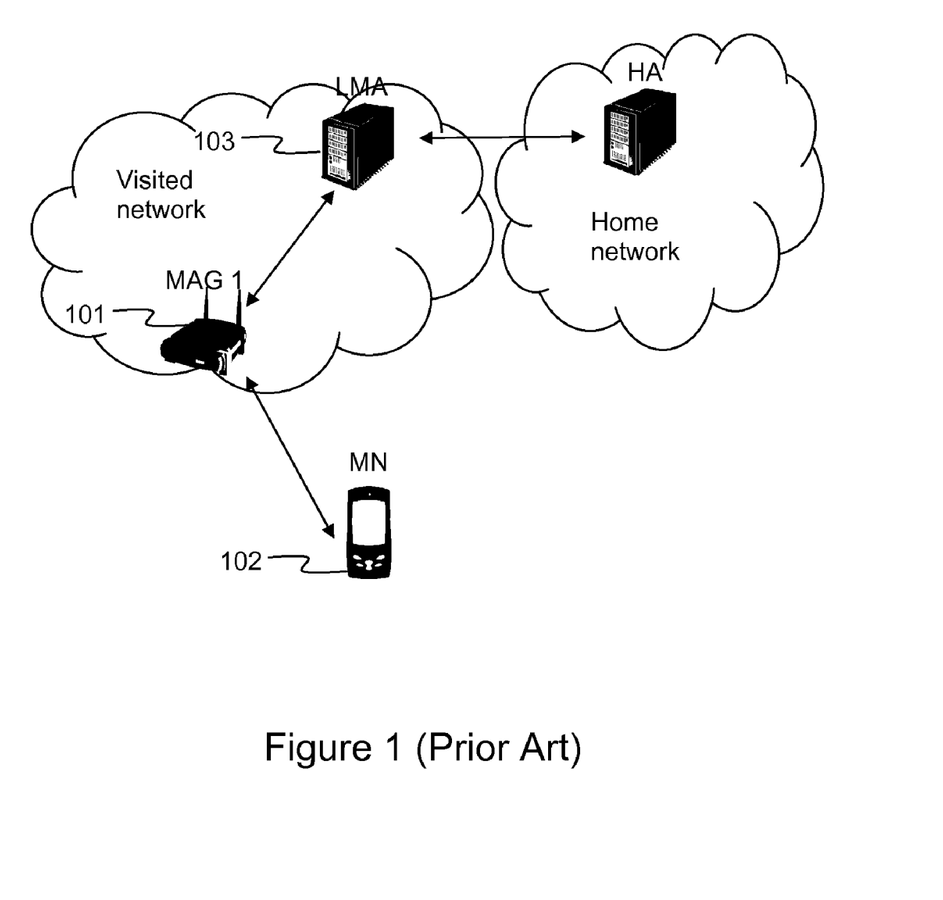
FIG. 1 illustrates schematically in a block diagram a Proxy Mobile IPv6 architecture.

Proxy Mobile IPv6 (PMIPv6), IETF draft-sgundave-mip6-proxymip6-07, describes a Mobile Access Gateway (MAG) function. This function emulates home link properties in order to make a MN behave as though it is on its home network and allows support for mobility on networks that would not otherwise support MIPv6. A key difference between PMIPv6 and MIPv6 is that using MIPv6, a MN has control of its own mobility signalling, whereas using PMIPv6, a MN does not have control of its mobility signalling. The basic components of a PMIPv6 architecture are illustrated in FIG. 1.

A MAG 101 is usually implemented at the access router. The MAG 101 sends and receives mobility related signalling on behalf of a MN 102. When a MN 102 connects to an access router having a MAG 101, the MN 102 presents its identity in the form of a Network Access Identifier (NAI) as part of an access authentication procedure. Once the MN 102 has been authenticated, the MAG obtains the user's profile from a policy store. The MAG 101, having knowledge of the user profile and the NAI, can now emulate the MN's home network. The MN 102 subsequently obtains its home address from the MAG. The MAG 101 also informs the MN's 102 Local Mobility Anchor (LMA) 103 of the current location of the MN 102 using a Proxy Binding Update message. The Proxy Binding Update message uses the NAI of the MN 102. Upon receipt of the Proxy Binding Update message, the LMA 103 sets up a tunnel to the MAG 101 and sends a Proxy Binding Acknowledgement to the MAG. On receipt of the Proxy Binding Acknowledgement, the MAG 101 sets up a tunnel to the LMA, effectively forming a bidirectional tunnel. All traffic to and from the MN 102 is routed through the LMA 103 via the bidirectional tunnel. A MAG may serve many MNs associated with the same LMA. The MAG and the LMA do not need to have a dedicated bidirectional tunnel for each MN. Instead the same bidirectional tunnel can be used for the traffic of all the MNs that are associated with the same LMA and that are currently being served by the same MAG.

The LMA 103 intercepts any packet that is sent to the MN 102, and forwards the intercepted packet to the MAG 101 through the tunnel. On receipt of the packet, the MAG 101 removes the tunnel header and sends the packet to the MN 102. The MAG 101 acts as a default router on the access link. Any packets sent from the MN are sent via the MAG 101 through the tunnel to the LMA 103, which then sends the packet on to its ultimate destination.

Enhanced Route Optimization (ERO), described in J. Arkko, C. Vogt and W. Haddad, "Enhanced Route Optimization for Mobile IPv6", IETF, RFC 4866, May 2007, specifies an amendment to MIPv6 route optimization. ERO secures a MN's home address against impersonation by using an interface identifier that is cryptographically and verifiably bound to the public component of the MN's public/private-key pair. ERO allows mobile and correspondent nodes to resume bidirectional communications in parallel by pursuing a care-of address test. The use of a Cryptographically Generated Address (CGA) for the MN leads to increased security and a reduction in signalling overhead. CGAs are described in T. Aura, "Cryptographically Generated Address (CGA)", IETF, RFC 3972, March 2005.

However, ERO cannot be applied to a PMIPv6 enabled network, as according to PMIPv6, the MN should be in a "mobility unaware" state. Applying ERO on behalf of the MN in a PMIPv6 enabled network would require the MN to share its CGA private key with nodes located in visited networks (such a MAG). This is obviously undesirable from a security point of view. The fact that the MN needs to share its private key also means that the MN cannot be completely unaware of the mobility.

CGA technology is currently used in PMIPv6 enabled networks, and reduces the number of redundant mobility signalling messages, which involve the MAG, HA, LMA and CN, and so a Route Optimization mechanism for PMIPv6 that uses CGA technology would be advantageous.

It would therefore be desirable to devise a Route Optimization mechanism that uses CGA technology, and can be used for MNs in a visited network, but that does not require the MN to share its private key with other nodes in visited networks. Furthermore, in a Secure Neighbour Discovery (SeND) scenario, it would be beneficial to allow a MN in a PMIPv6 network to be able to delegate the sending of SeND messages to a proxy node such as an Access Router. "A survey of the Secure Neighbour Discovery (SeND) and Multi-Key Cryptographically Generated Addresses (MCGAs)", Park et al, 9th International Conference on Advanced Communication Technology, Vol. 3, 12-14 February 2007, pages 2124-2127 surveys research on SeND messages.

It would be desirable for the MN to be able to delegate certain tasks to a proxy node in a secure way, for example to relieve the MN of computational/processing load. "Secure way" here means that it should be possible for a $3^{rd}$ party to verify that the proxy node is authorized to perform actions on behalf of the MN and that the proxy node has agreed to do so.

A way of doing this would be that the proxy node and MN "cross-certify" each other, e.g. by signing each others public keys. This has, however, two main drawbacks. First of all, due to the generality of such an approach, it is somewhat unclear which types of tasks the MN thereby agrees to delegate. Conversely it is somewhat unclear what the proxy node has agreed to do on behalf of the MN. Secondly, it poses computational load on the MN as it needs to perform an electronic signature.

SUMMARY

The inventors have devised a new approach to producing a Cryptographically Generated Address for a first node, which allows the first node to establish a cryptographic relationship with a second node. This allows the second node to prove to further nodes that it has a relationship with the first node. In the case where the first node is a Mobile Node in a Proxy Mobile IP network, and the second node is a Home Agent serving the Mobile Node, the cryptographic relationship between the MN and the HA is used in order for the HA to provide route optimization for a MN without requiring the MN to share private cryptographic materials with other nodes in a visited network. In the case where the first node is a Mobile Node and the second node is an Access Router, the cryptographic relationship allows the MN to delegate the responsibility of Secure Neighbour Discovery (SeND) protocol to the Access Router, as the AR can demonstrate to other nodes that is has a cryptographic relationship with the MN.

According to a first aspect of the invention, there is provided a method of establishing a cryptographic relationship between a first node and a second node in a communications network. The method comprises, at the first node, receiving from the second node at least part of a cryptographic attribute belonging to the second node. The first node then uses the received at least part of the cryptographic attribute, as well as at least part of a cryptographic attribute belonging to the first node, to generate an identifier for the first node. The use of the second node's cryptographic attribute to generate the first node's identifier establishes a trust relationship between the two nodes that can, if required, be demonstrated to a third party. The fact that the identifier is generated in a certain way at the first node can be used to demonstrate that the first node is happy to enter into the trust relationship with the second node, and prevents the second node from attempting to demonstrate a trust relationship with the first node without the consent of the first node.

Optionally, the first node's identifier comprises a Cryptographically Generated IP address, and the cryptographic attribute may be a public key belonging to the second node. The method optionally further comprises, at the first node, concatenating the cryptographic attribute belonging to the second node with a random value, hashing the concatenated result, and at the first node using at least part of the resultant hash value as a modifier for generating the identifier. In this case, the method optionally further comprises, at the second node, sending the identifier of first node and the random value to a third node, and at the third node, using the identifier belonging to the first node and the random value to verify that the second node has a trust relationship with the first node. The term "random value" is used herein to refer to a value that is randomly or pseudo-randomly generated. As an option, the method may further comprise, at the second node, signing a message containing the identifier belonging to the first node and the random value.

The communications network optionally comprises a proxy-Mobile IP network, in which the first node is a Mobile Node, and the second node is a Home Agent associated with the Mobile Node. This allows the Home Agent to provide Route Optimization on behalf of the Mobile Node.

Optionally, the first node is a Mobile Node and the second node is a proxy node via which the Mobile Node attaches to the communications network. This may be, for example, a Mobile Node and a Mobile Access Gateway respectively. Optionally, the proxy node sends Secure Neighbour Discovery messages on behalf of the Mobile Node.

The method optionally further comprises, at the second node, detecting a flooding attack relating to the first node. As a result of the detection, the second node sends a flush request message to a third node, the flush request message instructing the third node to flush all Binding Cache Entries relating to the first node. The flush request message comprises the identifier belonging to the first node and other cryptographic materials used to generate the identifier. In this way, if the first node has initiated a flooding attack and then left the network, the proxy node can show that it is entitled to act on behalf of the first node to a third node, which can then stop the flooding attack by deleting all Binding Cache Entries relating to the first node.

According to a second aspect of the invention, there is provided a node for use in a communications network, the node comprising a receiver for receiving from a second node, at least part of a cryptographic attribute belonging to the second node, and a processor for generating an identifier for the node using the received at least part of the cryptographic attribute belonging to the second node, and at least part of a cryptographic attribute belonging to the node, thereby establishing a cryptographic relationship between the node and the second node.

Optionally, the identifier is a Cryptographically Generated IP address, and the cryptographic attribute may be a public key belonging to the second node.

The node optionally comprises means for concatenating the cryptographic attribute belonging to the second node with a random value, means for hashing the concatenated result, and means for using at least part of the resultant hash value as a modifier for generating the identifier for the node.

According to a third aspect of the invention, there is provided a proxy node for use in a communications network. The proxy node comprises a memory for storing an identifier of a first node associated with the proxy node, the identifier having been generated using at least part of a cryptographic attribute belonging to the proxy node and at least part of a cryptographic attribute belonging to the first node. The proxy node further comprises a transmitter for sending to a further node the identifier and cryptographic materials used to generate the identifier. The identifier and cryptographic materials can then be used by the further node to verify that the proxy node is entitled to send messages on behalf of the first node.

Optionally, the identifier is a Cryptographically Generated IP address and the cryptographic attribute is a public key belonging to the proxy node.

As an option, the proxy node further comprises means for detecting a flooding attack relating to the first node, and means for sending a flush request message to a further node, the flush request message instructing the further node to flush all Binding Cache Entries relating to the first node, the flush request message comprising the identifier belonging to the first node and other cryptographic materials used to generate the identifier. In this way, if the first node has initiated a flooding attack and then left the network, the proxy node can show that it is entitled to act on behalf of the first node to a third node, which can then stop the flooding attack by deleting all Binding Cache Entries relating to the first node.

It will be apparent to one skilled in the art that the identifier of the first node may include its IP address, a name of the node, or other types of addresses associated with the node. For example, the Host Identity Tag (HIT) according to R. Moskowitz et al, draft-ietf-hip-base-10, IETF, could be used as the identifier.

DETAILED DESCRIPTION

The following description sets forth specific details, such as particular embodiments, procedures, techniques, etc. for purposes of explanation and not limitation. In some instances, detailed descriptions of well known methods, interfaces, circuits, and devices are omitted so as not obscure the description with unnecessary detail. Moreover, individual blocks are shown in some of the drawings. It will be appreciated that the functions of those blocks may be implemented using individual hardware circuits, using software programs and data, in conjunction with a suitably programmed digital microprocessor or general purpose computer, using application specific integrated circuitry, and/or using one or more digital signal processors.

On a high level, the present invention describes a method with the following characteristics.

1. In a first step, the MN shows its willingness to delegate certain tasks, associated with an attribute of the MN (e.g. an identifier such as its IP address), to a proxy. To this end, the MN generates the corresponding attribute in dependence of some attribute of the proxy (e.g. the proxy's public key). This is done in a cryptographically "binding" way such that a $3^{rd}$ party can (efficiently) verify the delegation and that there is no doubt that the MN has delegated certain responsibilities to a particular proxy. For example, the MN cannot claim to have delegated to another proxy without changing the corresponding MN attribute. For example, the MN attribute is generated as result of applying a cryptographic hash function to (at least part of) the proxy's attribute.

2. In a second, optional step, the proxy performs the verification of the MN's delegation, and if the proxy accepts the tasks delegated, the proxy issues a publicly verifiable proof of the binding between the proxy's attribute and the MN's attribute. This proof could, for instance, be performed by an electronic signature of the MN's attribute.

If step 2 is implemented, it is preferably performed each time a $3^{rd}$ party wishes to verify the delegation validity, preferably by including a "nonce" supplied by the $3^{rd}$ party in said proof.

The "scope" of the tasks delegated to the proxy could also be included in the generation of the MN's attribute. Preferably, this scope is then included in machine or human readable form so that it can be verified exactly which tasks that the MN/proxy has agreed to delegate. In other cases, there may be an "implicit" understanding of which tasks that are delegated. For example, when the attribute is an IP address of the MN, the default scope of the delegation could be proxying of signalling on behalf of the MN.

Figure 2:
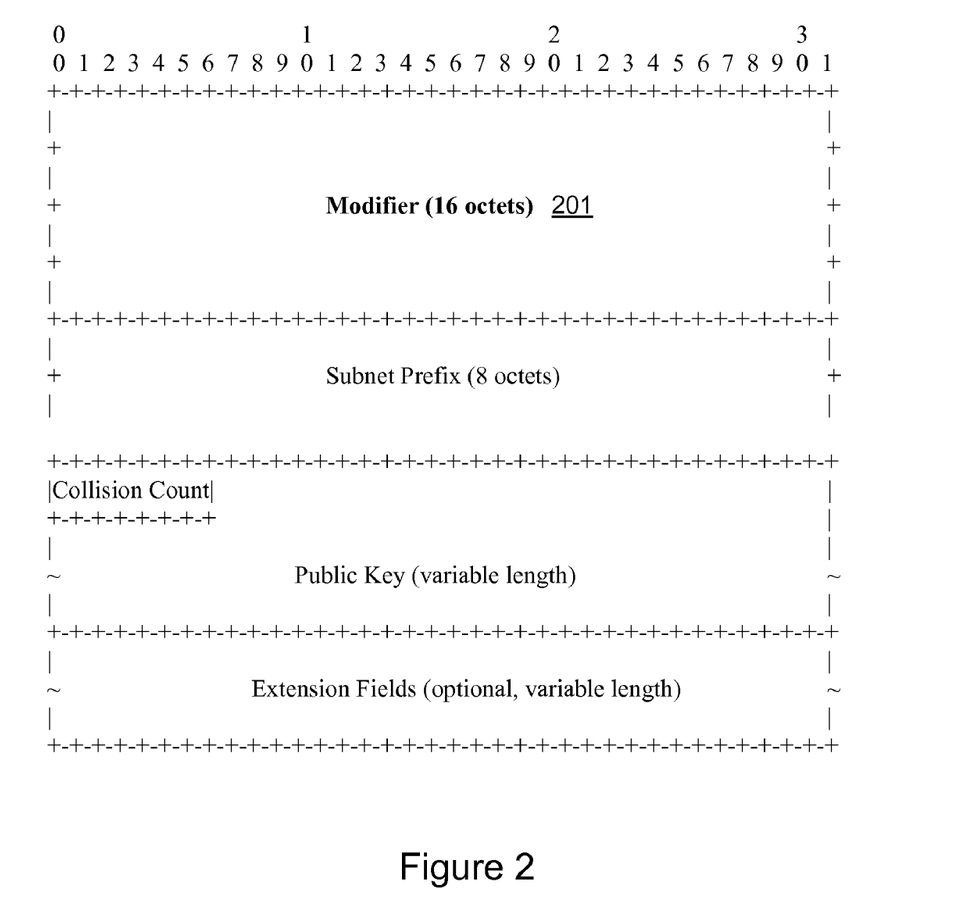
FIG. 2 illustrates schematically Cryptographically Generated Address parameters.

In a first embodiment of the invention, a new approach for generating a Cryptographically Generated Address (CGA) for a Mobile Mode (MN) is provided, i.e. the MN's attribute is a CGA. The MN has a Home Agent (HA), and the MN includes the public key (HKp) of the HA when generating a 64-bit interface identifier (IID) of an IPv6 home address for the MN. An example of a way of including HKp in the MNs IPv6 home address is as follows:

In the CGA approach described in RFC 3972, the MN derives a random 128-bit parameter called a modifier (MD). MD is used, among other parameters such as a network prefix and the MN's CGA Public Key (Kp), to generate a 64-bit ID. The CGA parameters are illustrated in FIG. 2. According to the first embodiment of the invention, HKp is used when generating the MD by concatenating it with a random 128 bit value (for example the value of the MD in prior art CGA), and then hashing the result. The first 128 bits of the resulting hash value is used as the new MD. This can be represented as follows:

New MD=First [128, Hash (HKp|RAN(128))]

where "RAN(128)" is a random 128-bit parameter.

While there could be many (HKp, RAN(128)) values that produce the same "New MD"; if a cryptographic (collision resistant) hash function is used, it can be assumed computationally infeasible (for the MN or any other party, including the proxy) to find another (HKp, RAN(128)) pair giving the same MD. The length of the RAN parameter could be both larger and shorter than 128 bits. The main purpose of the RAN parameter is to provide "freshness" so that it is unlikely to ever (re)produce the same New MD even if the same HKp is used. Furthermore, the MN can disclose the RAN to a remote node to further prove that it is willing for the proxy node to act on its behalf.

Note that in FIG. 2, "Modifier" 201 is a field that contains a 128-bit unsigned integer, which can be any value. The modifier is used during CGA generation to implement the hash extension and to enhance privacy by adding randomness to the address.

However, note that complete privacy is not possible as the public key of the MN is also needed and can thus be used to "trace" a MN.

This mechanism "binds" the MN's IPv6 address to the public key of its HA, thereby creating a "cryptographic" relationship between the MN and its HA. Once this binding between the IPv6 address and HKp is made, no other node can claim a similar relationship with this particular address even if it can use the RAN(128) parameter and pretend that it can provide all parameters needed to generate the IPv6 address. A malicious node would need to show "ownership" of the public key of the MN used in generating the MD associated with this particular address. To show ownership, the malicious node would require knowledge of the private key corresponding to the public key, and this is obviously infeasible. Note that this refers to the public key of the MN. If the HA is asked by a 3$^{rd}$ party to "prove" the relationship, the HA would do this by signing (using its private/public key) the RAN(128) parameter. In this case, forging a relationship would mean also knowledge of the HA private key.

Furthermore, by proper choice of cryptographic functions, it can be assumed computationally infeasible for a malicious node to emulate a cryptographic relationship with an existing IPv6 address, as it needs to find CGA parameters that fit together with its own public key in order to generate the same IPv6 address. It follows that a cryptographic relationship can be considered as unique.

Figure 3:
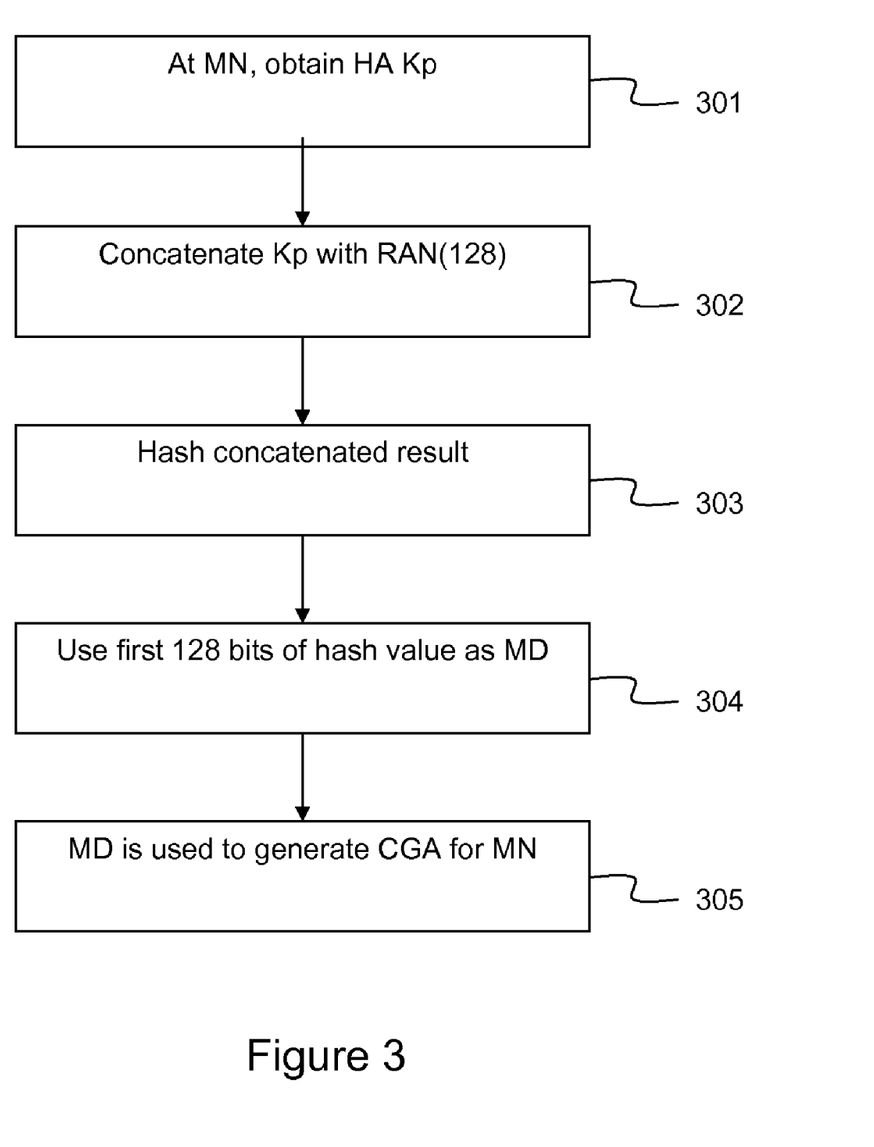
FIG. 3 is a flow diagram illustrating the basic steps of a first embodiment of the invention.

The basic steps of generating an IPv6 address for the MN are illustrated in FIG. 3, and are as follows:
301. The MN obtains the public key, Kp, of the HA;
302. Kp is concatenated with random 128-bit value RAN (128), e.g. selected at random by the MN;
303. The concatenated result is hashed;
304. The first 128 bits of the hash value are used as modifier MD; and
305. MD is used to generated a CGA for the MN According to a second embodiment of the invention, the cryptographic relationship between the MN and the HA is exploited and applied in a PMIPv6 environment to provide Route Optimization (RO) for the MN.

The HA discards any Home Test Init/Home Test (HoTI/HoT) message(s) sent by the MN or its Correspondent Node (CN) that carrying a home address which is not generated conforming to the formula described in the first embodiment above. This requires that all MNs served by the HA must use the HA's public key, HKp, when generating their own CGA home address.

The MN enables its HA to check the ownership of the MN's CGA home address before binding it to the RAN(128) and its HKp (i.e., both parameters have been used to generate the new MD). Once the address ownership is proved to be valid and the binding between HKp, RAN(128) and the MN's home address is completed, the HA can prove that there is a relationship between the MN and HKp, which provide evidence of trust to the CN to encourage it to provide a service to the MN without directly communicating with the MN, but rather communicating directly with a MAG serving the MN. In an embodiment of the invention, proving address ownership is carried out by the HA signing at least RAN(128) and a nonce provided by the CN. The nonce is beneficial as it prevents a malicious CN to use an already obtained signature and "replay" it to other CN(s). Optionally, if the HA has a shared key with the CN, this shared key could be used instead of the HA's public/secret key-pair.

Figure 4:
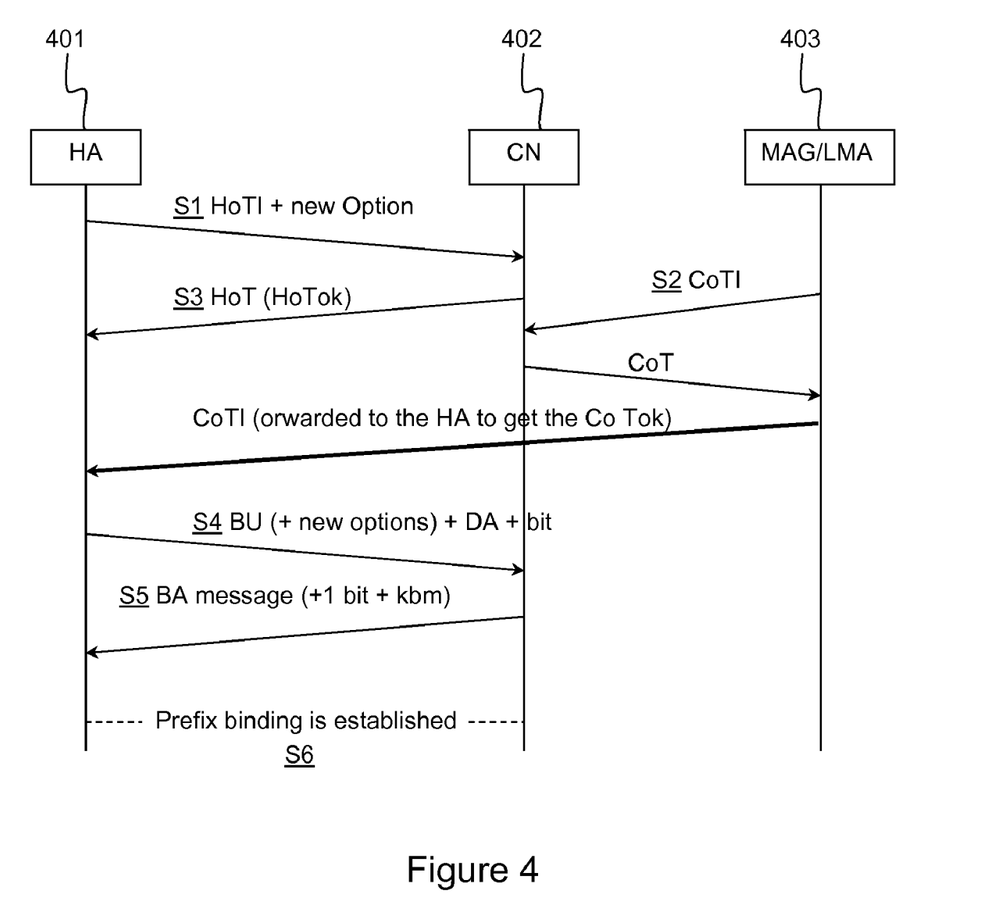
FIG. 4 illustrates schematically the signalling for establishing a binding between a Home Agent and a Correspondent Node according to an embodiment of the invention.

FIG. 4 illustrates the signalling for a Return Routability (RR) Procedure in which a HA 401 establishes a long lifetime security association with a CN 402. The CN 402 is already exchanging data packets with the MN using the Bidirectional Tunnelling (BT) mode between the HA 401 and the MAG 403 currently serving the MN. Using the numbering of FIG. 4, the steps are as follows:

S1. Following the receipt of a valid Proxy Binding Update (PBU) message sent by the MN's current MAG 403, the MN's HA 401 takes a decision to provide RO mode service to the MN (e.g., for a particular traffic/flow). The HA 401 sends a HoTI message to the CN 403. The HoTI message has a new option inserted, termed "Dual Address (DA)", which carries the new CoA sent by the MAG 403 to the HA 401. Note that the CoA can be sent using different means. For example, the CoA could be sent to MAG 403 in an option carried in the PBU message, regardless of the HA's 401 decision whether or not to trigger the RO mode for the particular home address carried in the PBU message. The DA option inserted in the HoTI message constitutes a special request for the CN 402 to include the CoA when computing a Home Keygen Token (HoTok). The IPv6 source address used in the HoTI message sent to the CN 402 must belong to the HA 401, and should be a CGA address derived using its HKp.

By introducing the DA option, the HA 401 is able to detect a HoTI message sent by a malicious node which has established a "cryptographic" relationship with the HA, but is trying to establish a special binding with the CN in order to launch a flooding attack against a network, or the CN 402 itself. The HA 401 is the only entity allowed to establish a special binding with a particular CN 402, which enables it to use its "cryptographic" relationship with the MN in order to provide it the RO mode service.

S2. In parallel with exchanging the pair of HoTI/HoT messages with the CN 402, the MAG/LMA 403 may also assist the MN's HA 401 in completing the RR procedure in order to trigger the RO mode for the MN. In this case, the MAG/LMA 403 performs an address reachability test for the CoA sent to the HA 401, by exchanging a pair of Care-of Address Init/Care-of Address test (CoTI/CoT) messages with the CN 402 and receiving a Care-of Keygen Token (CoTok) in return. In order to ensure that the HA 401 maintains full control of the RO mode, the HA 401 performs the CoTI/CoT exchange. For this purpose, the HA 401 tunnels a CoTI message to the MAG/LMA 403 which in turn decapsulates the CoTI message and forwards it to the CN 402. The CN 402 replies to the MAG/LMA 403, and so this reply is in turn tunnelled back to the HA 401.

S3. After receiving the HoTI message sent by the HA 401, the CN 402 replies by sending a HoT message which carries the HoTok. The CN remains stateless.

S4. Upon receiving the CoTok forwarded from the MAG/LMA 403, the HA 401 combines the CoTok with the HoTok received from the CN 402, in order to generate a temporary shared secret (Ks), as described in RFC 3775. The HA 401 then sends a BU message signed with its private key (in addition to authenticating it with Ks) and inserts all CGA parameters (i.e., including HKp) into the BU message in order to provide a proof of ownership to the CN 402. The HA 401 may need to set a new bit in the BU message in order to remind the CN 402 that the HoTok has been generated using both the HA's IPv6 address and the CoA. The new bit also serves to request the CN 402 to bind only the prefix part of the HA address to the CoA. This means that the binding will be between a 64-bit prefix and a normal IPv6 address and thus, would not lead to any data packet exchange between the two nodes, which could otherwise be exploited by a malicious eavesdropping node.

S5. After receiving a valid BU message, the CN 402 generates a long lifetime secret (Kbm), encrypts it with HKp and sends it back to the HA 401 in a Binding Acknowledgement (BA) message, which is also authenticated with Ks (and can be signed with the CN's CGA key). The CN 402 also sets a new bit called a "Prefix Binding (PB)" in order to indicate to the HA 401 that the requested binding between the HA address prefix and the CoA has been successful. The CN stores the HA's public key (i.e., HKp) together with Kbm, HA's IP address prefix, the CoA and the CN's IP address in the corresponding Binding Cache Entry (BCE).

S6. When the HA 401 receives a valid BA message from the CN 402, it sends a new BU message to the CN 402 that includes the MN's home address in an option called the "Linked Home Address (LHA)" option. The HA 401 includes all CGA parameters which have been used by the MN to derive its IPv6 address from HKp (including the RAN(128) value). The HA 401 authenticates the BU message using Kbm. This BU message is used to request the CN 402 to add the MN's home address to the binding created between the HA address prefix (which is the same as the MN address prefix) and the CoA by showing the relationship between the HA 401 and the MN.

Note that the HA 401 does not need to exchange HoTI/HoT messages with the CN 402 using the MN's home address, as it has already shown the CN 402 that it can be reachable at the same prefix as the one used by the MN. However, a CoTI/CoT exchange may be helpful in order to prove to the CN 402 that the HA 401 with which the MN has a "cryptographic" relationship is always able to intercept the CoTok, which corresponds to the CoA assigned to the MAG interface. In this case, the HA sends the CoToK in the BU message of step S4. This can be done either by inserting it in a new option or by merging it with Kbm. In the latter case, the CN 402 should also use the same new key to authenticate the BA message sent to the HA 401 in step S5. There is no need to periodically repeat the CoTI/CoT exchange provide that the MN has not moved to another MAG.

In alternative to the embodiment described above, the content of the second BU message is included in the first BU message. The HA 401 inserts the MN's HoA as well as its CGA parameters, including the RAN(128) value, in the first BU message sent to the CN 402 following the Return Routability (RR) procedure. By providing a proof of the "cryptographic" relationship with the MN's HoA, the HA 401 implicitly hints to the CN 402 that it is also able to intercept the HoToK and CoTok for any RR procedure which can be run on the MN's behalf (note that in such RR, the HoTI message will use the MN's HoA as the source address and the HoT message will be sent to the MN's HoA, and the CoTI/CoT exchange will involve the same CoA as the one used by the HA 401). In this case, there is no need to exchange any additional CoTI/CoT messages other than the one used by the HA 401.

Note that it is possible for a malicious node to configure other nodes under its control in order to have a "cryptographic" relationship with each one of them. This relationship can be exploited later to launch an attack against a network/node. In a MIPv6 and/or PMIPv6 environment, a first and critical line of defence requires the HA 401 to block any possible attempt by a malicious node to establish a prefix binding with a CN 402 and then redirect all nodes under its control towards the same CoA 402. In order to do that, the attacker would need to send a HoTI message carrying the new DA option described above. While this option enhances the overall security of the RR procedure, it also allows the HA 401 to detect an attack at a very early stage by simply looking into the HoTI message. The attack is thwarted by dropping the packet.

The visited network is also able to repel a flooding attack. According to MIPv6 protocol, a defence against a network flooding attack is to repeat the return routability procedure periodically (say, every 7 minutes). Even if the MN is not moving, the HoTI.HoT and CoTI/CoT signalling exchange described above is performed periodically. This requires a significant amount of signalling.

A malicious node (the MN) may launch a flooding attack against the network. Once the attack has been detected, the MAG/LMA 403 explicitly requests that the HA 401 sends an authenticated signalling message to the CN 402 requesting it to flush the malicious node(s) corresponding BCE(s). The "repelling" type of defence can also be fully implemented at the MAG/LMA 403, in which case the MAG/LMA 403 sends a "flush request" message directly to the CN(s) 402 without going through the HA 401. This is useful in a scenario in which the HA is itself compromised after the bindings are established. In this case, the MAG 403 performs a CoA test with the CN 402, and then sends a special "Binding Flush Request". The Binding Flush request message includes the MN's CoA together with the proof that the MAG and the MN have a cryptographic relationship, and so is signed with the MAG's private key.

On receiving a flush request, the CN 402 first ensures that the CoA in question is stored in the CN's Binding Cache Entry (BCE) table. Once it has validated that the MAG is entitled to act on behalf of the MN, the CN flushes the MN's CoA from its BCE table and terminates all ongoing sessions using that CoA. The CN also sends a flush acknowledgement to the MAG.

According to a further embodiment of the invention, the cryptographic relationship between two nodes can be used to allow a MN to delegate the responsibility of Secure Neighbour Discovery (SeND) protocol to a proxy node such as an Access Router (AR). SeND (see J. Arkko, J. Kempf, B. Sommerfield, B. Zill and P. Nikander, "Secure Neighbour Discovery (SeND)", RFC 3971, March 2005) enables establishing a relationship between hosts attached to the same link and/or between a host and its access routers (ARs). SeND uses an IPv6 CGA on the host side, and deploys a local public key infrastructure in the access network.

Using SeND protocol, all router advertisement (RtAdv) messages as well as any neighbour discovery protocol (described in T. Narten, E. Nordmark, W. Simpson and H. Soliman, "Neighbor Discovery for IP version 6 (IPv6)", RFC 4861, September 2007) messages sent by an AR are signed. In addition, any host can configure a CGA-based IPv6 address and use its properties to provide a "proof of ownership" when exchanging neighbour discovery protocol messages with other hosts located on the same link.

By using the cryptographic relationship between two nodes as described above, a host using a CGA IPv6 address can delegate the task of SeND proxying to its AR.

When a CGA enabled node attaches to a link where the AR is using SeND to sign its RtAdv messages, the node can securely obtain a copy of AR's public key (Kp) and establish a cryptographic relationship between the node and the AR. A 128-bit random parameter is used to re-compute the node's CGA IPv6 address. The 128-bit random parameter requires a modification in order to enable the node to establish a cryptographic relationship with the AR. The 128-bit random parameter is replaced with another one that is created by generating random parameter (e.g., 128 or 256-bit), then concatenating this parameter with the AR's Kp before hashing the concatenation. The node then takes the first 128 bits of the resulting hash and uses it as the new random 128-bit parameter for generating a 64-bit identifier of its CGA IPv6 address.

The rule for computing the new 128-bit random parameter can be represented as follows:

$$\text{New CGA 128-bit Random Parameter} = \text{First}[128, \text{Hash}(Kp | RAN(128))]$$

where:

First(size, input) indicates a truncation of the "input" data so that only the first "size" bits remain to be used.

RAN(z) is a z-bit random parameter "|" denotes a concatenation

A recommended hash function is SHA256.

After computing the new 128-bit parameter, the node proceeds to compute its IPv6 address as defined in the CGA specification. However, the node must send RAN(128) to its AR in order to make the AR aware of the cryptographic relationship. The node can insert RAN(128) in a new option (called SRO) to be carried, for example, in a router solicitation (RtSol) message sent to the AR. For added security, the node encrypts SRO using the AR's Kp.

Upon receiving a RtSol message carrying an SRO, the AR first checks the validity of the cryptographic relationship. The SRO is preferably decrypted, and the AR checks that the CGA IPv6 address was generated using the AR's Kp. If the AR determines that the CGA IPv6 address was generated using the AR's Kp, then the AR proceeds to check the address ownership and verify the signature. After that, the AR stores the node's RAN(128), together with its address and all associated CGA parameters.

In the case where the node decides not to reveal the cryptographic relationship to its AR, then the node can continue using SeND protocol by disclosing only its new 128-bit CGA parameter to the AR.

When the AR needs to prove to a third party that it is authorized to act on behalf of the MN, the AR discloses the cryptographic relationship to the third party to provide a "proof of relationship". This is done by informing the third party of the MN's IPv6 address and all CGA components that the MN has used to generate it. These components include the RAN(128) value instead of the 128-bit random parameter. In addition, the AR signs the message sent to the third party containing this information. Preferably, the AR also includes a nonce provided by the third party in this signature. No other node can claim the same privilege to act on behalf of the node unless it can forge signatures, which is can be assumed to be infeasible. It can also be assumed infeasible for a malicious node to generate another key pair and try to re-build a whole chain of parameters that leads to the same IPv6 address used by the MN.

It may be possible to use a cryptographic relationship with a non-CGA Mobile Node. The MN derives its IPv6 address by applying the same rule mentioned earlier with the difference that it has to take the first 64-bit and use them as interface identifier for configuring the IPv6 address. According to this scenario, the host sends a RtSol message to the AR, in which it includes the SRO and encrypts it with AR's Kp. Note that the RtSol message in this case won't be signed, but the Mobile Node uses a 64-bit interface identifier in the IPv6 source address in order to enable the AR to check on the validity of the source address. This service may be useful for low processing power devices as it allows delegation of the neighbour discovery proxying task to its AR.

A cryptographic relationship can be automatically established between a MN and its AR when stateful address configuration is in place, i.e. when the MN does not freely choose its own address. This may be done by enabling a DHCP to generate IPv6 addresses to be allocated to MNs attaching to the link. The DHCP then shares the RAN(128) with the AR without involving the MN. In this scenario, the AR may signal to the MN its ability to act on behalf of the MN by setting a bit in the RtAdv message.

As mentioned above, the cryptographic relationship can be used to enable SeND proxying to mobile/static hosts. In order to do so, each MN must establish a cryptographic relationship with its AR (i.e., after checking its certificate) then sending it the corresponding RAN(128) parameter together with its CGA parameters. Note that one way to delegate SeND neighbour discovery protocol (NDP) proxying tasks to the AR is to disclose the cryptographic relationship to the AR in a RtSol message which can be sent by the MN. After sending a RtSol message carrying an SRO, the sending node (i.e. the node that has established a cryptographic relationship with the proxy node) stops replying to any neighbour discovery protocol query. In other words, the sending node decides when to "vanish" from the link whenever it sees it appropriate.

For privacy purposes, the MN may decide to delegate the proxying task to its AR even while being physically attached to the link, in order to avoid disclosing its own CGA public key when signing NDP messages. In fact, disclosing the public key can severely harm the unlinkability aspect especially when the MN is using one or more pseudo-IPv6 addresses. When the MN is switching between different ARs it may wish to maintain a certain degree of location privacy, which would otherwise be broken by disclosing the CGA public key.

When acting as a SeND proxy on behalf of a particular host, the AR includes, in each NDP message sent on behalf of the MN, all of the MN's CGA parameters as well as the RAN(128) value, in order to enable the third party node to derive the MN's IPv6 address, using the AR's Kp, before checking the validity of the NDP message. If the third party node cannot compute the provided MN's IPv6 address from parameters sent by the AR, the third party node discards the message.

Another setting where it could be useful to create a cryptographic relationship is in the context of the Host Identity Protocol (HIP). Here, the (mobile) node has a Host Identity Tag (HIT) attribute, which is generated by hashing the public key of the node, i.e. HIT=HASH( . . . , PKn, . . . ). In a similar fashion to the embodiments described above, the node also includes the public key of some other entity when creating the HIT. In general, the invention can be used when a node generates a temporary "identifier" or other attribute. For example, an EAP (Extensible Authentication Protocol, IETF RFC 3748) pseudonym or GPRS P-TMSI may be generated according to this method. It is also possible to delegate "financial" transactions by generating a (temporary) "account number" according to the present invention.

According to all of the embodiments described above, the RAN supplied buy the first node (for example the Mobile Node) does not in itself constitute an absolute proof that the proxy node is acting on behalf of the first node, as there may be an advantage for the proxy node to behave dishonestly and perform acts on behalf of the first node that should not be performed. In such instances, the first node must also use its public key to generate the IP address, and so the first node must also provide its public key to a third node in order for a third node to verify that the proxy node is entitled to act on behalf of the mobile node.

Figure 5:
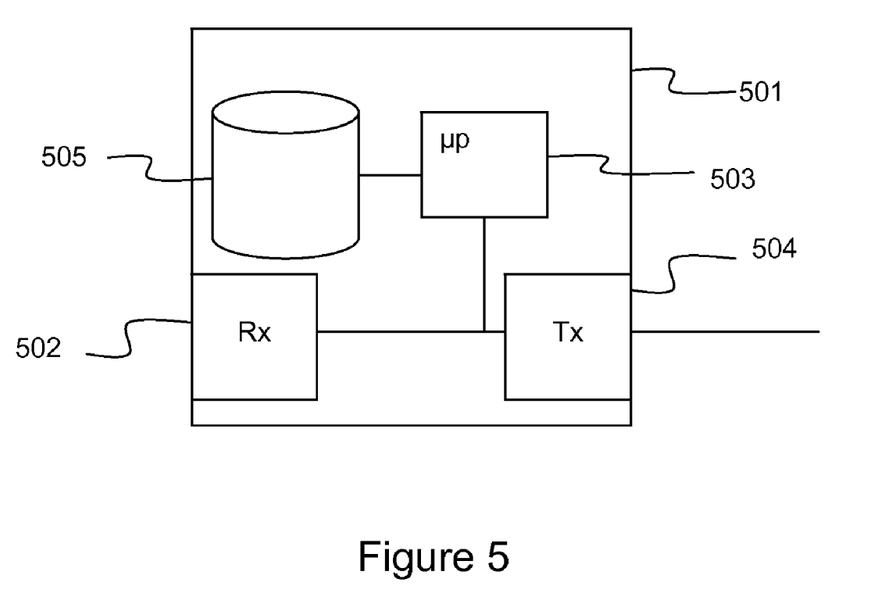
FIG. 5 illustrates schematically in a block diagram a network node according to embodiments of the invention.

Turning now to FIG. 5, there is illustrated a network node 501' in accordance with an embodiment of the invention. In this example, the network node is a Mobile Node 501, and comprises a receiver 502 for receiving the public key of the proxy node associated with the Mobile Node, and a processor 503 for generating a Cryptographically Generated IP address for the MN. The Mobile Node further comprises a transmitter 504 for communicating with the proxy node, and a memory 505 for storing the generated IP address.

Figure 6:
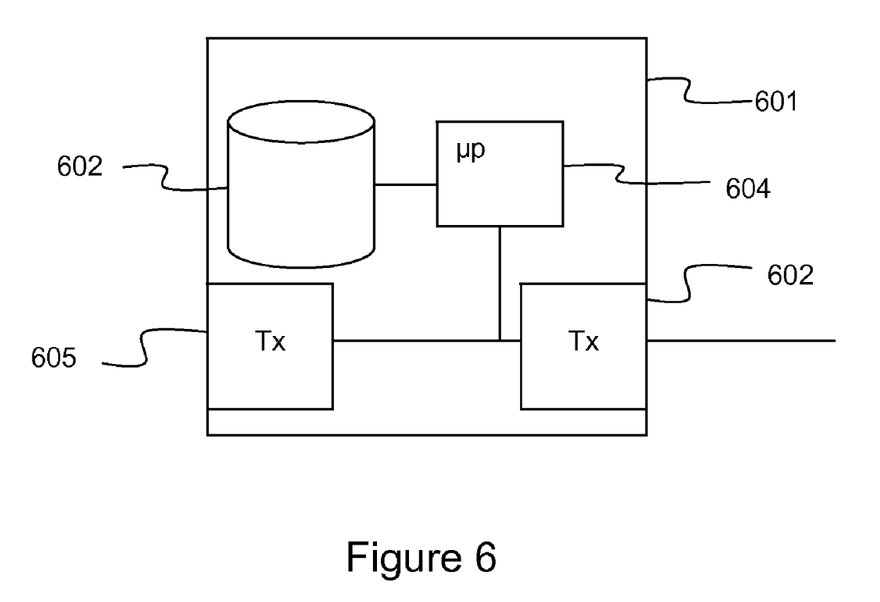
FIG. 6 illustrates schematically in a block diagram a proxy node according to an embodiment of the invention

FIG. 6 illustrates a proxy node 601, which is provided with a memory 602 for storing an identifier belonging to a MN associated with the proxy node, the identifier having been generated as described above. A first transmitter 603 is provided for sending to a further node the identifier and cryptographic materials used to generate the identifier and a signature of these values, which allows the further node to verify that the proxy node is entitled to send messages on behalf of the first node. A first processing function 604 is provided for creating the signature, and a second transmitter 605 is provided for sending the signature to a further node to allow the further node to verify that the proxy node is entitled to send messages on behalf of the first node.

Although various embodiments have been shown and described in detail, the claims are not limited to any particular embodiment or example. None of the above description should be read as implying that any particular element, step, or function is essential such that it must be included in the claims' scope. The scope of patented subject matter is defined by the claims.

The following acronyms are used in this specification:
BA Binding Acknowledgment
BCE Binding Cache Entry
BT Bidirectional Tunnelling Mode (MIPv6)
BU Binding Update
CGA Cryptographically Generated Address
CN Correspondent Node
CoT Care-of Address Test Message
CoTI Care-of Address Init Message
CoTok Care-of Keygen Token
HA Home Agent
HKp Home Agent public key
HKr Home Agent private key
HoT Home Test Message
HoTI Home Test Init Message
HoTok Home Keygen Token
IETF Internet Engineering Task Force
Kp Mobile Node CGA public key
Ks Shared Key between the HA and the CN
LMA Local Mobility Anchor
MAG Mobile Access Gateway
MD Modifier
MIPv6 Mobile IPv6
MN Mobile Node
NDP Neighbour Discovery Protocol
PMIPv6 Proxy MIPv6
RO Route Optimization Mode (MIPv6)
RR Return Routability Procedure
PBU Proxy Binding Update Message
SeND Secure Neighbour Discovery

The invention claimed is:

1. A method of establishing a cryptographic relationship between a Mobile Node and a proxy node in a communications network, the method comprising:
- at the Mobile Node, receiving from the proxy node at least part of a cryptographic attribute of the proxy node;
- using the received at least part of the cryptographic attribute and at least part of a cryptographic attribute of the Mobile Node to generate an identifier for the Mobile Node;
- at the proxy node, detecting a flooding attack relating to the Mobile Node;
- as a result of the detection, sending a flush request message to a third node, the flush request message instructing the third node to flush all Binding Cache Entries relating to the Mobile Node, the flush request message comprising the identifier belonging to the Mobile Node and other cryptographic materials used to generate the identifier.

2. The method according to claim 1, wherein the Mobile Node's identifier is a Cryptographically Generated IP address.

3. The method according to claim 1, wherein the cryptographic attribute of the proxy node comprises a public key belonging to the proxy node.

4. The method according to claim 1, further comprising:
- at the Mobile Node, concatenating the cryptographic attribute belonging to the proxy node with a random value;
- hashing the concatenated result; and;
- using at least part of the resultant hash value as a modifier for generating identifier for the Mobile Node.

5. The method according to claim 4, further comprising:
- at the proxy node, sending the identifier belonging to the Mobile Node and the random value to a third node;
- at the third node, using the identifier belonging to the Mobile Node and the random value to verify that the proxy node has a trust relationship with the Mobile Node.

6. The method of claim 5, further comprising, at the proxy node, signing a message containing the identifier belonging to the Mobile Node and the random value.

7. The method according to claim 1, wherein the communications network comprises a proxy-Mobile IP network, and the proxy node is a Home Agent associated with the Mobile Node.

8. The method according to claim 7, further comprising providing Route Optimization to the Mobile Node via the Home Agent.

9. The method according to claim 1, wherein the proxy node is a proxy node via which the Mobile Node attaches to the communications network.

10. The method according to claim 9, further comprising sending Secure Neighbour Discovery messages from the proxy node on behalf of the Mobile Node.

11. A proxy node for use in a communications network, the proxy node comprising:
- a memory for storing an identifier belonging to a Mobile Node associated with the proxy node, the identifier having been generated using at least part of a cryptographic attribute belonging to the proxy node and at least part of a cryptographic attribute belonging to the Mobile Node;
- a transmitter for sending to a further node the identifier and cryptographic materials used to generate the identifier, the identifier and other cryptographic materials to be used by the further node to verify that the proxy node is entitled to send messages on behalf of the Mobile Node; and
- a processor operable to:
- detect a flooding attack relating to the Mobile Node; and
- send a flush request message to a further node, the flush request message instructing the further node to flush all Binding Cache Entries relating to the Mobile Node, the flush request message comprising the identifier belonging to the Mobile Node and other cryptographic materials used to generate the identifier.

12. The proxy node according to claim 11, wherein the identifier is a Cryptographically Generated IP address and the cryptographic attribute is a public key belonging to the proxy node.

* * * * *

UNITED STATES PATENT AND TRADEMARK OFFICE
CERTIFICATE OF CORRECTION

PATENT NO. : 8,295,487 B2  
APPLICATION NO. : 12/744198  
DATED : October 23, 2012  
INVENTOR(S) : Haddad et al.

Page 1 of 2

It is certified that error appears in the above-identified patent and that said Letters Patent is hereby corrected as shown below:

ON THE TITLE PAGE:

Item (56), under "OTHER PUBLICATIONS", in Column 2, Line 1, delete ""Flusing" and insert -- "Flushing --, therefor.

Item (56), under "OTHER PUBLICATIONS", in Column 2, Line 1, delete "Optimizaiton" and insert -- Optimization --, therefor.

IN THE DRAWINGS:

In Fig. 6, Sheet 5 of 5, delete "  " and insert --  --, therefor.

IN THE SPECIFICATIONS:

In Column 5, Line 31, delete "invention" and insert -- invention. --, therefor.

In Column 7, Line 23, delete "MN" and insert -- MN. --, therefor.

In Column 7, Line 63, delete "403." and insert -- 402. --, therefor.

In Column 8, Lines 56-64, delete "Acknowledgement......... (BCE)." and insert the same at Line 55, after "Binding" as continuation of paragraph.

In Column 12, Line 52, delete "501'" and insert -- 501 --, therefor.

Signed and Sealed this  
Twelfth Day of March, 2013

Teresa Stanek Rea  
*Acting Director of the United States Patent and Trademark Office*

IN THE CLAIMS:

In Column 14, Line 10, in Claim 4, delete "and;" and insert -- and --, therefor.

In Column 14, Line 20, in Claim 6, delete "of" and insert -- according to --, therefor.